United States Patent [19]

Rebhan et al.

[11] Patent Number: 4,902,529
[45] Date of Patent: Feb. 20, 1990

[54] PROCESS FOR THE FLUORINATION OF SYNTHETIC RESIN ARTICLES

[75] Inventors: Dieter Rebhan, Geretsried; Reinhard Strigl, Munich, both of Fed. Rep. of Germany

[73] Assignee: Linde Aktiengesellschaft, Wiesbaden, Fed. Rep. of Germany

[21] Appl. No.: 275,870

[22] Filed: Nov. 25, 1988

[30] Foreign Application Priority Data

Nov. 25, 1987 [DE] Fed. Rep. of Germany ....... 3739994

[51] Int. Cl.$^4$ .............................................. B05D 3/06
[52] U.S. Cl. ...................................... 427/37; 427/237; 427/238
[58] Field of Search .......................... 427/37, 237, 238

[56] References Cited

FOREIGN PATENT DOCUMENTS 59-159806  9/1984  Japan .

*Primary Examiner*—Stanley Silverman
*Attorney, Agent, or Firm*—Millen, White & Zelano

[57] ABSTRACT

For the fluorination of synthetic resin articles, e.g., containers, the article to be fluorinated is positioned in a gastight chamber, and a fluorinating treatment gas is produced from a fluorine precursor in situ, e.g., with the aid of a plasma torch from a basic gas mixture comprising a fluorine-containing compound, e.g., $CF_4$ or $SiF_6$.

8 Claims, 1 Drawing Sheet

PROCESS FOR THE FLUORINATION OF SYNTHETIC RESIN ARTICLES

BACKGROUND OF THE INVENTION

The invention relates to the post fluorination of synthetic resin articles of manufacture, e.g., containers.

Fluorine, owing to its aggressive nature, is a hazardous working substance which attacks, corrodes, or even destroys a great variety of materials. In particular, it is very toxic to the human organism.

For this reason, special measures have to be taken when using fluorine in industrial processes so as to ensure the safety of such a facility and the occupants therein. For example, special conduit systems, seals and encapsulations of entire facilities are required. Even delivery and storage must undergo special precautions.

At the present time, fluorine is available for industrial use, especially for fluorination processes, in gas bottles in a mixture with nitrogen. The fluorine concentration of such gaseous mixture is low for safety reasons, merely about 10–20%. Inasmuch as in the fluorination of synthetic resin articles, fluorine concentrations of only about 10% or less are sufficient, the fluorine-nitrogen supply gas is generally further diluted with pure nitrogen to the extent desired.

Two fluorination methods are known, in principle, in the production of fluorinated synthetic resin articles, especially hollow components: fluorination is performed either in one operating step (inline process) with the molding of the article, for example during blow molding (e.g., German Patent No. 2,401,948), or the fluorination is conducted in a separate working step (offline process) subsequent to the actual manufacturing procedure (German Patent No. 2,644,508).

However, in either case, when performing the fluorination, care must be taken to handle the fluorine-containing gaseous mixture safely. This array of problems is also dealt with in the inline procedure discussed in German Patent No. 3,523,137.

SUMMARY OF THE INVENTION

An object of one aspect of the present invention is to provide an effective process for the fluorination of synthetic resin articles, especially a cost-effective process which satisfies high safety requirements.

Upon further study of the specification and appended claims, further objects and advantages of this invention will become apparent to those skilled in the art.

To attain these objects, there is provided a process comprising providing an article of manufacture made of a synthetic resin capable of being fluorinated; providing a gas comprising a fluorine-containing chemical compound capable of being converted into fluorine; introducing said article and said gas into a substantially gastight zone; forming elemental fluorine in said zone; and effecting therein fluorination of said article. Gaseous fluorine precursors are preferred.

Preferably, the process comprises introducing the finished molded synthetic resin article into a treatment chamber that can be sealed gastight, positioning the article in this chamber, and introducing a plasma torch, or having a plasma torch present therein, and then, after sealing the treatment chamber, producing fluorine-containing treatment gas with an electric arc of the plasma torch from a basic gas mixture introduced into the interior of the treatment chamber and comprising an inert gas and a fluorine-containing compound (compounds), by splitting the fluorine containing compound in the electric arc, for such a time until the desired fluorination has been attained.

The process of this invention provides a hazard-free fluorination of synthetic resin items since elemental fluorine is produced only at the site where fluorination is to take place. For this reason, only the actual treatment chamber and the discharge side of a fluorination facility need satisfy the safety requirements for fluorine. In contrast thereto, the supply side can be designed with merely conventional components used in gas technology.

Examples of synthetic resins which can be fluorinated by the present invention, include but are not limited to: polymeres and copolymeres of olefines, vinylchlorid and styrol.

When performing the preferred process of this invention, either nitrogen or argon, or a mixture of both, is advantageously utilized as the inert gas constituting a portion of the basic gas mixture. Such a mixture, on the one hand, promotes the function of the plasma torch and, on the other hand, represents a suitable diluent for fluorine-containing, gaseous compounds constituting the second component of the basic gas mixture. In general, the volume percent of the inert gas in the basic gas mixture is about 70 to 95%, preferably 80 to 90%. Handling fluorine-containing compounds does not present any serious problems since fluorine is present only in bound form.

In general, any fluorine precursor can be used for fluorination, including but not limited to $SF_6$, $CF_4$ or $C_2F_6$.

Fluorine is produced in the gastight zone, preferably brought about by the effect of the electric arc of the plasma torch. In the electric arc of the plasma torch the fluorine containing compound, for example $CF_4$, reacts, as far as we know today, as shown in the following equations:

$$CF_4 \rightarrow C + 2F_2.$$

Followed by the important fluorination step with HF-product gas:

$$F_2 + C_nH_m \rightarrow C_nH_{m-1}F + HF.$$

In an advantageous further embodiment, the treatment chamber is purged with pure inert gas subsequent to fluorination in order to flush out—after turning off the torch—any fluorine that might still be present.

In an especially advantageous embodiment of the process, the basic gas mixture is introduced by way of the gas feed means for the plasma torch. In this arrangement, no additional gas supply conduit is required, and the basic gas mixture is fed to the electric arc of the plasma torch in an advantageous way. Thus, the gas exiting the gas feed means for the plasma torch, into the treatment chamber, has preferably a composition, by volume, of 70 to 95% of inert gas and 30 to 5% of gas of a fluorine-containing compound.

A special and advantageous version for the process according to the invention is obtained in the fluorination of hollow synthetic resin articles, for example tanks, wherein the plasma torch and likewise the basic gas mixture as well as the purge gas are introduced directly into the interior of the hollow synthetic resin articles.

The supply of the basic gas mixture into the interior and the introduction of the plasma torch into the interior of the hollow article to be fluorinated bring about production of the fluorine exactly at the site where fluorination is to take place, namely on the inside of the hollow article. Such hollow articles include but are not limited to all sorts of bottles and vessels for evaporating liquids, for example petrol tanks.

By supplying a basic gas mixture in a sufficient quantity and for a sufficient suitable duration of the feeding step, it is possible to attain an exact, economical, and substantially hazardless interior fluorination; the supply parameters (composition and amount) in this connection are preferably adjusted to obtain an optimum utilization of the bound fluorine.

The operating conditions for the fluorination are preferably as follows:
(a) temperature of the article, from 40° to 120° C.,
(b) purging the treatment chamber with pure inert gas before introducing the basic gas mixture to flush out oxygen and moisture,
(c) passing into the treatment chamber the basic gas mixture, containing 80 to 90% argon and 10 to 20% $CF_4$, whereby the plasma torch is in operation,
(d) purging the treatment chamber subsequent with inert gas.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
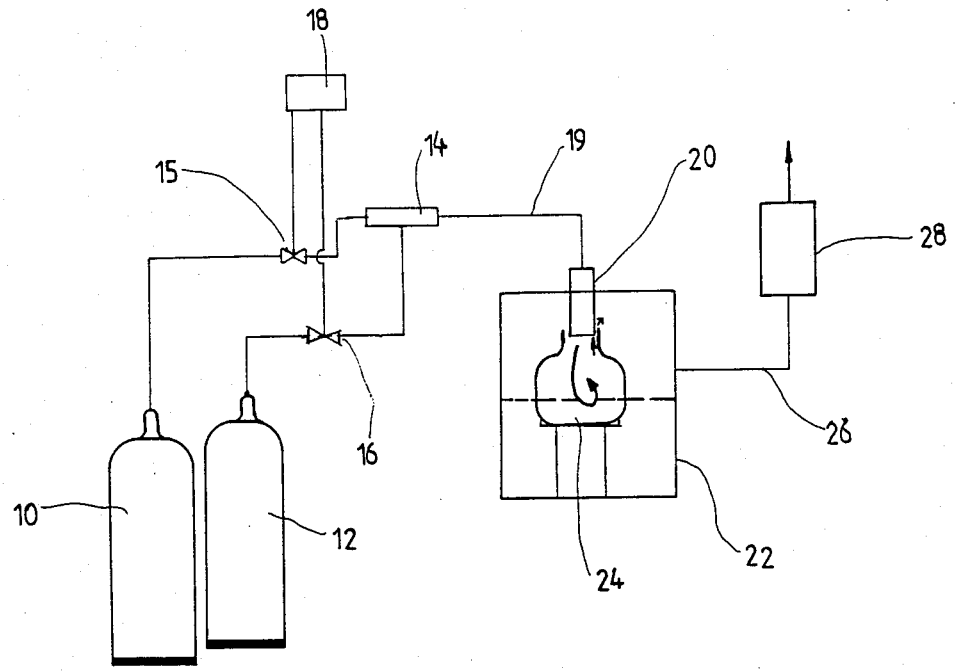
FIG. 1 is a schematic representation of a preferred overall embodiment of the invention.

An inert gas storage vessel 10 and a fluorine compound gas vessel 12 are connected with a mixing unit 14. In both connection lines are disposed switching valves 15, 16. The two switching valves 15 and 16 are steered by an automatic steering unit 18. A conduit 19 connects the mixing unit 14 with a plasma torch 20, which is disposed at the top side of a gastight treatment chamber 22. A synthetic resin container 24 is positioned inside the treatment chamber 22 and the plasma torch 20 is disposed adjacent to an opening 26 of the container 24. An exhaust pipe 26 is leaving the treatment chamber 22 and leads to an exhaust gas cleaner 28, which is provided for filtering out the HF-gas components and the rest of unreacted $F_2$-gas in the exhaust gas. This apparatus allows it to carry out the method according to the invention, for example like explained in detail in the preferred operating conditions mentioned above.

Figure 2:
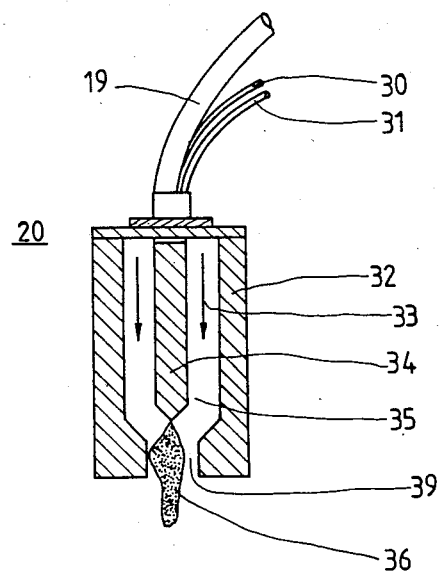
FIG. 2 illustrates details for the preferred embodiment for the plasma torch.

FIG. 2 shows an advantageous plasma torch 20. The gas supply is ensured by the conduit 19. The lines 30 and 31 are connecting the plasma torch with a DC power supply. The plasma torch substantially consists of a cylindrically shaped outer wall 32 and a central stick 34 disposed on the middle axes of that hollow casing. An opening 39 is at the open end side of the plasma torch 20. Between the outer wall 32 and the central stick 34 is an annular channel 35 which represents the gas feed means of the plasma torch 20. The supplied gas flows as indicated by arrows 33. An electric arc 36 is generated at the open end side of the plasma torch 20 burning between the central stick 34 and the wall 32. The basic gas mixture flows through channel 35 and passes the electric arc 36 at the opening 39. Thus the fluorine containing compound in the basic gas mixture is splitted off by the electric arc and delivers fluorine containing treatment gas to fluorinate the synthetic resin articles disposed adjacent the plasma torch.

Without further elaboration, it is believed that one skilled in the art can, using the preceding description; utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by volume.

The entire texts of all applications, patents and publications, if any, cited above and below, and of corresponding application West German No. P. 37 39 994, filed Nov. 25, 1988, are hereby incorporated by reference.

EXAMPLES

EXAMPLE 1

A blow-molded synthetic resin container is positioned in a treatment chamber that can be sealed gastight. A plasma torch with the preferred holder is inserted through the opening of the container. Also the gas feed and discharge conduits for the basic gas mixture and the treatment gas and/or residual gas after fluorination are located at the holder. Moreover, the holder is designed so that, after incorporation of the torch, this holder is connected gastight at the opening for the container to be treated, in the normal case. After sealing the treatment chamber, treatment gas is then supplied to the interior of the container with the plasma torch being simultaneously turned on.

The synthetic resin container is made of polyethylen and the dimensions thereof are about 0.1 $m^3$.

The basic gas mixture has a composition of 90 Vol % Ar-gas and 10 Vol % $CF_4$-gas.

In the interior of the container, the actual, fluorine-containing treatment gas is formed from the basic gas mixture, effecting the fluorination of the interior walls of the container, additionally enhanced by the waste heat from the torch. The treatment period is selected in correspondence with the fluorination desired, as determinable by experiments, for example 10 to 120 seconds.

After the fluorination and turning off the torch pure argon is introduced into the interior of the container in order to flush out any gaseous fluorine still present. During the entire treatment, the treatment chamber is also purged with an inert gas to likewise safely remove any fluorine-containing gas that may exit from the container.

It can be seen that substantially only the discharge side for the apparatus needs to be designed in accordance with standards required for fluorine, and that otherwise the invention brings about a high degree of safety at a cost-effective expense. The discharge side design is conventional, for example, as shown in FIG. 1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process of fluorinating a synthetic resin article of manufacture in order to reduce permeability with respect to gases and vapors, said process comprising inserting said article into a treatment chamber that can be sealed gastight, passing into the treatment chamber a basic gas mixture comprising an inert gas and a fluorine-containing chemical compound capable of being converted to elemental fluorine, splitting the fluorine-containing compound with an electric arc of a plasma torch to produce a gas containing elemental fluorine, and fluorinating said article.

2. A process according to claim 1, further comprising purging the treatment chamber with inert gas after the fluorination.

3. A process according to claim 1, wherein the inert gas is at least one of nitrogen and argon and the fluorine-containing chemical compound is at least one of $SF_6$ and $CF_4$.

4. A process according to claim 1, wherein the basic gas mixture is introduced by way of gas feed means employed for the plasma torch.

5. A process according to claim 2, for the fluorination of hollow articles, wherein the plasma torch, the basic gas mixture, and the purge gas are introduced directly into the interior of the hollow synthetic resin article.

6. A process according to claim 4, wherein the inert gas is at least one of nitrogen and argon and the fluorine-containing chemical compound is at least one of $SF_6$ and $CF_4$.

7. A process according to claim 5, wherein the inert gas is at least one of nitrogen and argon and the fluorine-containing chemical compound is at least one of $SF_6$ and $CF_4$.

8. A fluorination process providing an article of manufacture made of a synthetic resin capable of being fluorinated;

providing a gas comprising a fluorine-containing chemical compound capable of being converted into elemental fluorine;

introducing said article and said gas into a substantially gastight zone;

forming elemental fluorine in said zone with a plasma torch; and effecting therein fluorination of said article.

* * * * *